US010968667B2

(12) United States Patent
Nottebaum et al.

(10) Patent No.: US 10,968,667 B2
(45) Date of Patent: Apr. 6, 2021

(54) METHOD AND DEVICE FOR IMPINGING ON A MOTOR VEHICLE DOOR IN THE SENSE OF A DECELERATION, IN PARTICULAR FOR AVOIDING COLLISIONS

(71) Applicant: Kiekert AG, Heiligenhaus (DE)

(72) Inventors: Thorsten Nottebaum, Mühltal (DE); Markus Berghahn, Kerpen (DE)

(73) Assignee: Kiekert AG, Heiligenhaus (DE)

( * ) Notice: Subject to any disclaimer, the term of this patent is extended or adjusted under 35 U.S.C. 154(b) by 179 days.

(21) Appl. No.: 16/077,060

(22) PCT Filed: Jan. 9, 2017

(86) PCT No.: PCT/DE2017/100027
§ 371 (c)(1),
(2) Date: Aug. 10, 2018

(87) PCT Pub. No.: WO2017/137030
PCT Pub. Date: Aug. 17, 2017

(65) Prior Publication Data

US 2019/0055762 A1 Feb. 21, 2019

(30) Foreign Application Priority Data

Feb. 12, 2016 (DE) ..................... 10 2016 102 510.0

(51) Int. Cl.
*E06B 3/00* (2006.01)
*E05C 17/00* (2006.01)
(Continued)

(52) U.S. Cl.
CPC ............ *E05C 17/006* (2013.01); *E05C 17/12* (2013.01); *E05C 17/203* (2013.01); *E05Y 2900/531* (2013.01)

(58) Field of Classification Search
CPC ...... E05C 17/006; E05C 17/203; E05C 17/12; E05Y 2900/531; E05F 15/40
See application file for complete search history.

(56) References Cited

U.S. PATENT DOCUMENTS 4,644,693 A * 2/1987 Wang .................... E05F 15/619 49/280
5,369,911 A * 12/1994 Fortunato ............... E05F 5/025 49/25
(Continued)

FOREIGN PATENT DOCUMENTS

CN 101596851 A 12/2009
CN 104981581 A1 10/2015
(Continued)

OTHER PUBLICATIONS

International Search Report and Written Opinion for corresponding Patent Application No. PCT/DE2017/100027 dated Apr. 18, 2017.

*Primary Examiner* — Jerry E Redman
(74) *Attorney, Agent, or Firm* — Renner, Otto, Boisselle & Sklar, LLP

(57) ABSTRACT

A method and to a device for impinging on a motor vehicle door in the sense of a deceleration, in particular for avoiding collisions. There is at least one sensor assigned to the motor vehicle door. Furthermore, as a function of signals from the sensor, the control unit actuates the locking device for locking the motor vehicle door. The locking device applies a preferably variable braking torque to the motor vehicle door, taking into account a braking start predetermined by the control unit.

12 Claims, 3 Drawing Sheets

(51) Int. Cl.
*E05C 17/20* (2006.01)
*E05C 17/12* (2006.01)

(56) References Cited

U.S. PATENT DOCUMENTS

| | | | | | |
|---|---|---|---|---|---|
| 5,468,042 | A * | 11/1995 | Heinrichs | E05C 17/305 16/51 |
| 6,275,231 | B1 * | 8/2001 | Obradovich | B60R 16/0231 345/156 |
| 8,650,799 | B2 * | 2/2014 | Chen | E05F 15/43 49/26 |
| 9,511,730 | B1 * | 12/2016 | Wu | B60W 50/14 |
| 9,580,046 | B2 * | 2/2017 | Luu | E05F 15/73 |
| 9,777,528 | B2 * | 10/2017 | Elie | E05F 15/41 |
| 9,797,178 | B2 * | 10/2017 | Elie | E05F 15/42 |
| 10,000,961 | B2 * | 6/2018 | Elie | E05F 15/40 |
| 10,030,431 | B2 * | 7/2018 | Elie | E05F 15/77 |
| 10,041,281 | B1 * | 8/2018 | Miu | E05F 15/622 |
| 10,145,165 | B2 * | 12/2018 | Elie | E05F 15/60 |
| 10,151,132 | B2 * | 12/2018 | Elie | E05F 15/60 |
| 10,240,386 | B2 * | 3/2019 | Wise | E05F 15/75 |
| 10,329,823 | B2 * | 6/2019 | Khan | E05F 15/42 |
| 10,428,572 | B2 * | 10/2019 | Oster | E05F 15/622 |
| 10,443,287 | B2 * | 10/2019 | Elie | G01D 5/34 |
| 10,443,289 | B2 * | 10/2019 | Rrumbullaku | E05F 15/71 |
| 10,458,171 | B2 * | 10/2019 | Khan | E05F 15/611 |
| 10,570,656 | B2 * | 2/2020 | Elie | E05F 15/75 |
| 10,596,958 | B2 * | 3/2020 | Rowell | B60Q 1/525 |
| 2005/0085972 | A1 * | 4/2005 | Martinez | E05C 17/00 701/49 |
| 2005/0242618 | A1 * | 11/2005 | Menard | E05F 15/43 296/146.4 |
| 2007/0296242 | A1 | 12/2007 | Frommer | |
| 2008/0295408 | A1 * | 12/2008 | Heissler | E05F 15/619 49/324 |
| 2008/0296927 | A1 * | 12/2008 | Gisler | E05F 15/43 296/146.4 |
| 2009/0051192 | A1 * | 2/2009 | Ewing | E05F 15/622 296/146.2 |
| 2009/0120002 | A1 * | 5/2009 | Domholt | E05F 15/619 49/340 |
| 2010/0156139 | A1 | 6/2010 | Herrmann | |
| 2011/0260848 | A1 * | 10/2011 | Rodriguez Barros | B60Q 1/323 340/438 |
| 2012/0194356 | A1 * | 8/2012 | Haines | B60Q 1/323 340/933 |
| 2012/0236319 | A1 | 9/2012 | Gotou | |
| 2013/0088578 | A1 * | 4/2013 | Umezawa | G06K 9/00805 348/47 |
| 2013/0138303 | A1 * | 5/2013 | McKee | E05F 15/73 701/49 |
| 2013/0234844 | A1 * | 9/2013 | Yopp | B60Q 9/008 340/435 |
| 2015/0059250 | A1 * | 3/2015 | Miu | E05F 15/614 49/349 |
| 2015/0240548 | A1 * | 8/2015 | Bendel | E05C 17/003 701/49 |
| 2015/0283886 | A1 * | 10/2015 | Nania | E05F 15/73 296/146.4 |
| 2016/0208537 | A1 * | 7/2016 | Senguttuvan | E05F 15/73 |
| 2017/0021759 | A1 * | 1/2017 | Zhang | B60R 16/02 |
| 2017/0030126 | A1 * | 2/2017 | Elie | B60J 5/047 |
| 2017/0218678 | A1 * | 8/2017 | Kothari | B60Q 1/323 |
| 2017/0369016 | A1 * | 12/2017 | Gurghian | G01S 17/93 |
| 2017/0371347 | A1 * | 12/2017 | Cohen | G06T 7/269 |
| 2018/0044963 | A1 * | 2/2018 | Gomez Melchor | E05F 15/40 |
| 2018/0174450 | A1 * | 6/2018 | Im | G08G 1/0112 |
| 2018/0202212 | A1 * | 7/2018 | Xiao | E05F 5/025 |
| 2018/0238098 | A1 * | 8/2018 | Rhode | E05F 15/73 |
| 2019/0126815 | A1 * | 5/2019 | Morel | F21S 41/14 |

FOREIGN PATENT DOCUMENTS

| | | | |
|---|---|---|---|
| DE | 102004061687 | | 7/2006 |
| DE | 102008053087 | | 7/2009 |
| DE | 102008064570 | | 6/2010 |
| DE | 102009001668 | | 9/2010 |
| DE | 102009036870 | | 1/2011 |
| DE | 102012024375 | | 6/2014 |
| JP | S57191123 | A | 11/1982 |
| JP | 2002364249 | A | 12/2002 |
| JP | 200627483 | A | 2/2006 |
| JP | 2007239278 | A | 9/2007 |

* cited by examiner

METHOD AND DEVICE FOR IMPINGING ON A MOTOR VEHICLE DOOR IN THE SENSE OF A DECELERATION, IN PARTICULAR FOR AVOIDING COLLISIONS

FIELD OF INVENTION

The invention relates to a method and to a device for impinging on a motor vehicle door in the sense of deceleration, in particular for avoiding collisions, according to which the motor vehicle door has at least one sensor, a locking device and a control unit assigned to it and according to which the control unit actuates the locking device to lock the motor vehicle door dependent on sensor signals.

BACKGROUND OF INVENTION

For a method respectively a locking device of the construction described at the beginning according to DE 10 2009 041 499 A1, on the one hand a braking device with at least two braking elements and an actuator as an additional brake on the other hand is realized. Thereby collisions between the motor vehicle door and an obstacle in the environment shall be avoided. For this purpose, the sensor used here is formed as an environment sensor to record the environment of the pivotable motor vehicle door. As soon as the pivotable motor vehicle door approaches an obstacle, the actuator is activated.

In the known teaching according to DE 10 2009 041 499 A1, the additional braking module or the additional brake is provided with the actuator to prevent an operator actively closing the motor vehicle door on a relevant obstacle whether intentionally or unintentionally. Such collisions are generally observed if the relevant obstacle was overlooked by the operator or the force impact exerted during opening of the motor vehicle door was underestimated, for example. By recourse to the braking device with the two braking elements and the additional brake, the constructional cost with the known teaching is high and requires improvement.

Notwithstanding this, DE 10 2012 018 093 A1 of the applicant describes a method for impinging on a door wing of a motor vehicle door in the sense of deceleration/locking and/or closure/opening. A magnetic device is executed as a component of a drive. The control unit energizes the magnetic device in question dependent on sensor signals such that the door wing is optionally decelerated, locked or closed, opened or pushed out. The aim is for a functionally safe operation to be provided with a simple and cost-effective construction simultaneously. However, collisions of the motor vehicle door with an obstacle cannot or can anyhow not reliably be prevented.

Such collisions only occur if an operator overlooks the relevant obstacle, for example, during parking, a bollard, a stone or such static obstacle. Instead, collisions of the motor vehicle door can also occur with a moving obstacle. The moving obstacle can be another person, a passing bicycle or a passing car, etc. Although the class-specific state of the art works according to DE 10 2009 041 499 A1 to prevent such collisions with an environment sensor. Apart from the fact that the known locking device is of a complex construction, even this procedure cannot safely prevent and not in all cases prevent a collision.

For example, it is thus conceivable that the motor vehicle equipped with the relevant motor vehicle door is parked on a gradient. If the operator now opens the motor vehicle door, not only do the opening forces caused by the operator work the motor vehicle door, but their movement can additionally be accelerated by shear forces. Comparable situations are conceivable in the case of windy weather, for example, if the gust of wind takes hold of and depresses the partially open door. As the known locking devices do not or practically do not take into account all motor vehicle states, the risk exists that despite the acted on locking device the relevant motor vehicle door is only stopped after an extended braking distance which nevertheless cannot prevent a collision or permits a collision. This is where the invention is used.

SUMMARY OF INVENTION

The invention is based on the technical problem of thus further developing a method and a device for impinging on a motor vehicle door in the sense of deceleration, in particular to prevent a collision according to the class that collisions are prevented under all conceivable circumstances and environmental conditions and motor vehicle situations.

To solve this technical problem, a class-specific method for impinging on a motor vehicle door in the sense of deceleration, in particular to prevent a collision, within the scope of the invention is characterized in that the locking device acts on the motor vehicle door taking into account a braking start predetermined by the control unit and with a preferably variable braking torque.

Within the scope of the invention, it is therefore generally a case of impinging on the pertaining motor vehicle door in the sense of deceleration. However, this deceleration does especially, but not exclusively take place to prevent a collision, i.e. with the objective of preventing any collisions of the motor vehicle door with a static or dynamic obstacle in every case. For this purpose, not only is the locking device actuated by the control unit dependent on sensor signals to lock the motor vehicle door. Instead, the control unit explicitly determines a braking start. The braking start can consequently be variable and is specified by the control unit dependent on sensor signals.

With the braking start a certain pivot angle of the motor vehicle door or the pertaining door wing is typically meant. This pivot angle is swept as soon as the motor vehicle door is opened or closed compared to a motor vehicle chassis. Every pivot angle consequently corresponds to a certain position or a relative position of the motor vehicle door compared to the motor vehicle chassis. By the control unit now specifying the braking start of the locking device for the motor vehicle door, the control unit can in principle take into account previously unconsidered motor vehicle states and taking these into account.

For example, the braking start is brought forward in the plane compared to the situation during stopping of the motor vehicle on a gradient, in order to safely and reliably guarantee that the motor vehicle door stops automatically and at a minimum distance in front of the obstacle. A comparable situation applies where, for example, particular wind conditions need to be taken into account. If the braking torque is additionally optionally variable, the described motor vehicle states can optimally be taken into account.

Thus, for example, when parking a motor vehicle on a slope or also in the case of strong wind in general, the braking torque generated by the locking device and required to hold the motor vehicle door firm can be increased compared to the situation when stopping in a plane and in the absence of wind. Furthermore, the variable configuration of the braking torque gives the possibility of holding the pertaining motor vehicle door firm in practically any position with a maximum braking torque, for example. This can also occur for a defined duration of time. The motor vehicle door can thus optionally also be used as an alighting aid.

Therein are the fundamental advantages to be seen.

According to an advantageous configuration, the control unit evaluates signals from at least two sensors. The sensors in question are generally an environment sensor and a door sensor. The environment sensor is used to sense the entire potential pivot area of the motor vehicle door constantly in respect of obstacles being present in the relevant pivot area or moving obstacles appearing, for example. In this context, the entire pivot area corresponds to the position of the motor vehicle door closed compared to the motor vehicle chassis to attainment of the maximum pivot angle compared to the motor vehicle door. However, obstacles in this pivot area are constantly recorded with the aid of the environment sensor and transmitted to the control unit as corresponding signals.

The additionally provided for door sensor senses at least the pivot area of the motor vehicle door compared to the motor vehicle chassis. This means that with the aid of the door sensor the relative position of the motor vehicle door can be recorded compared to the motor vehicle chassis. Furthermore, the door sensor is regularly additionally set up to record the speed of the motor vehicle door in any pivoting movement. However, the detection of the pivot angle is usually sufficient on the part of the door sensor, because the control unit can calculate the speed of the motor vehicle door during differentiation from changes of the pivot angle over time. Hence the door sensor is usually a pivot angle sensor, with the aid of which the respective pivot angle of the motor vehicle door is recorded compared to the motor vehicle chassis. For this purpose, the pivot angle sensor may be arranged in the area of a door hinge.

This means that the environment sensor records a pivot area of the motor vehicle door and any obstacles appearing or located in the pivot area, if applicable. With the aid of the door sensor, the relative position of the motor vehicle door is recorded compared to the motor vehicle chassis. Furthermore, the door sensor is regularly set up additionally to detection of a motor vehicle door speed.

The control unit now specifies the braking start and the braking torque for the locking device dependent on the signals of the environment sensor and the door sensor. The configuration is such that according to the starting position of the motor vehicle door or the pertaining pivot angle and its speed, the optimum braking start and the braking torque to be exerted are specified by the control unit so that the motor vehicle door stops at a minimum distance before the obstacle and in particular prevents unwanted collisions.

Furthermore, further signals of additional sensors are typically evaluated by the control unit and used to actuate the locking device. This means that, additionally to the two sensors previously already discussed and described, the environment sensor and the door sensor, signals of other sensors are usually used and are processed by the control unit and converted into corresponding signals to actuate the locking device to lock the motor vehicle door. The corresponding sensors or the pertaining signals can be those of an operator sensor, a motor vehicle position sensor, a wind sensor, an alighting aid sensor, etc. in order to state some examples which are not exclusive.

The operator sensor is a sensor which detects whether the relevant motor vehicle door is operated by an operator from the inside or the outside. In the simplest case, the relevant operator sensor is configured as a handle switch which is assigned to the internal door handle or the external door handle and senses the internal door handle or the external door being acted on. Relevant signals of the operator sensor are recorded and evaluated by the control unit to the extent that it hereby involves or can involve start signals, for example.

This means that as soon as an operator operates the internal door handle or the external door handle and consequently the operator sensor emits a relevant signal to the control unit, the signal of the operating sensor can be used as a start signal to the extent that the environment sensor and the door sensor or their signals are received and evaluated by the control unit. This means that the ambient sensor and door sensor are only queried or their signal evaluated if, with the aid of the operator sensor, for example, an opening desire of the operator has actually been sensed in relation to the relevant motor vehicle door.

Furthermore, the control unit can evaluate a motor vehicle position sensor or its signals and take these into account in the actuation of the locking device for the motor vehicle door. The motor vehicle's position is ascertained with the aid of the motor vehicle's position sensor. In the simplest case, this involves an incline sensor, for example. If the incline sensor ascertains, for example, that the pertaining motor vehicle is traveling on a downward sloped way, the signal of the motor vehicle's position sensor is thus taken into account by the control unit in this case to the extent that after stoppage of the motor vehicle and during opening of the motor vehicle door, for example, the braking start is brought forward compared to a horizontal position of the motor vehicle and the braking torque is increased. On the contrary, when traveling on an incline it is possible and conceivable that, for example, the braking torque is decreased because the downhill force attacking the motor vehicle door during opening assists the braking effect so to speak. At the same time, the braking start can be pushed back compared to the situation in the plane.

Where a wind sensor is used as an additional sensor, corresponding signals in the control unit are evaluated to the extent that the braking torque generated by the locking device, for example, is increased in order to be able to control an additional opening torque on the motor vehicle door caused by the wind during the opening process of the motor vehicle door. Finally, the additional sensor can also be configured as an alighting aid sensor and is conceivable as such. In the simplest case, the alighting aid sensor can be a switch or a contact sensor, with the aid of which the braking torque provided by the locking device can be increased in any position or practically any conceivable pivot angle of the motor vehicle door to a certain value.

Here, for example, a maximum braking torque will be worked with in order to be able to use the pertaining motor vehicle door as an alighting aid for operators. In this case of impingement of the alighting aid sensor, the control unit regularly also ensures that the locking device is acted on with the relevant maximum braking torque for a certain time. The corresponding time duration is such that an operator can use the relevant motor vehicle door safely during this time for entry and alighting into or out of the motor vehicle.

According to a further advantageous configuration, the locking device impinges on the motor vehicle door in an immobile state with a holding torque independent from actuation by the control unit. This means that while the control unit generates a variable braking torque dependent on one or several sensor signals with the aid of the locking device on the motor vehicle door, the holding torque is provided on the locking device independently of the control unit. The holding torque ensures that the motor vehicle door is securely fixed in an immobile state and locked. In this regard, the holding torque of the locking device assumes the function of a conventional door locker working practically continuously so to speak. The holding torque is generally measured such that it is smaller than the maximum braking torque provided by the locking device.

The object of the invention is additionally a device impinging on a motor vehicle door in the sense of deceleration, in particular for the prevention of a collision, as described in claim 8 and the subsequent claims 9 and 10. The relevant device is especially suitable for execution of the previously described method. The configuration is preferably such that the locking device has an actuator coupled with the motor vehicle door. In the simplest case, this actuator may be an electromotor which is energized with the aid of the control unit or a driver stage downstream from the control unit. According to the energization of the actuator or the electromotor, a pertaining braking torque is generated on the outlet side of the locking device, in order to correspondingly imping on the motor vehicle door. For this purpose, the actuator advantageously interacts with an actuator connected to the motor vehicle chassis.

The actuator in question can be a toothed rack. The toothed rack is in the normal case firmly connected to the motor vehicle chassis with one end. Furthermore, the toothed rack or the relevant actuator is usually mounted in a displaced manner to the door hinge. The actuator or the electromotor now engages directly or by means of a gearbox with a pinion into the corresponding toothed rack. A variable braking torque generated with the aid of the actuator is thus exerted on the toothed rack.

As the actuator is coupled with the motor vehicle door or is attached in or on the motor vehicle door, a variable braking torque is thus provided between the actuator and consequently the motor vehicle door and the toothed rack connected supply to the motor vehicle chassis and consequently the motor vehicle chassis. Thus, the motor vehicle door can be acted on with the aid of the locking device, taking into account a variable braking torque.

The actuator can have a temperature overload protection. This means that in the case of a temperature generated by the actuator being above a specified temperature limit, the control unit regularly ensures that the energization of the actuator is reduced. This means that the control unit can also receive signals of a temperature sensor assigned to the actuator and take into account the actuation of the locking device and consequently the actuator.

Furthermore and finally, it is conceivable that the gearbox optionally located downstream from the actuator changes to generate the desired braking torque on the outlet side and during engagement into the toothed rack with regard to its transmission. The change to the gearbox transmission may also occur with the aid of the control unit. Thus, the control unit can act on the actuator taking into account different transmission characteristic curves, i.e. in essence taking into account different and optional gearbox transmissions. The relevant transmission characteristic curve or the gearbox transmission may also be transmitted as a signal to the control unit. However, dependent on the desired braking start and the necessary braking torque the control unit ensures that the locking device or the actuator there are correspondingly actuated taking into account the transmission characteristic curve and possibly the actuator temperature. This can also occur in the sense of control by the target values for braking start and braking torque respectively being compared with actual values and approximated in the sense of control. The braking torque can also otherwise be derived from the current strength on the actuator in this context.

As a result, a method and a device for impinging on a motor vehicle door in the sense of deceleration are described, with the aid of which the pertaining motor vehicle door can be safely decelerated and collisions are prevented, taking into account all conceivable motor vehicle states with obstacles. This all succeeds on account of a strikingly simple and cost-effective construction. In fact, the locking device is typically only equipped with an electromotor which can be acted on by the control unit or a driver stage downstream from the control unit and, if applicable, a gearbox which can be acted on by the electromotor. The gearbox works on the toothed rack as described to generate a variable braking torque.

Signals of different sensors are evaluated which are nevertheless generally present on modern motor vehicles and used for other purposes. Consequently, the corresponding signals can be tapped or derived from a control unit on the chassis side by the control unit on the door side. Naturally, it is also conceivable to combine the control unit on the chassis side and the control unit on the door side. Therein are the fundamental advantages to be seen.

The invention is explained in further detail hereafter on the basis of a drawing which only constitutes an exemplary embodiment. The following are shown:

DETAILED DESCRIPTION

Figure 1:
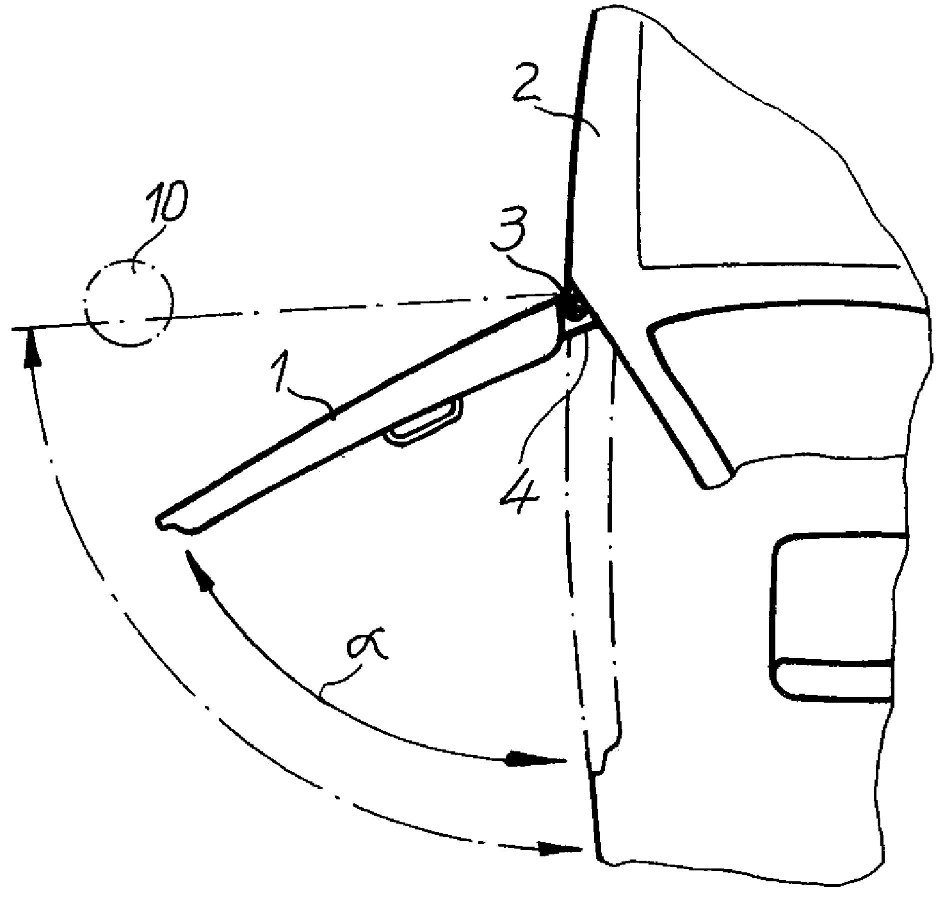
FIG. 1 a motor vehicle door together with sections of a motor vehicle chassis and the device for impinging on the pertaining motor vehicle door according to the invention in the sense of deceleration, FIG. 2 a detailed view of the object according to FIG. 1 in the area of a hinge for the motor vehicle door and FIG. 3 a flow chart which summarizes the individual process steps according to the invention again and correlates them

Shown in FIG. 1 is a motor vehicle door 1 which is pivotably connected to a motor vehicle chassis 2 with the aid of a hinge 3. The motor vehicle door 1 is not restrictedly a motor vehicle lateral door. However, in general, the motor vehicle door 1 can also be executed as a tailgate, a motor flap, a sliding door, etc., for example.

Figure 2:
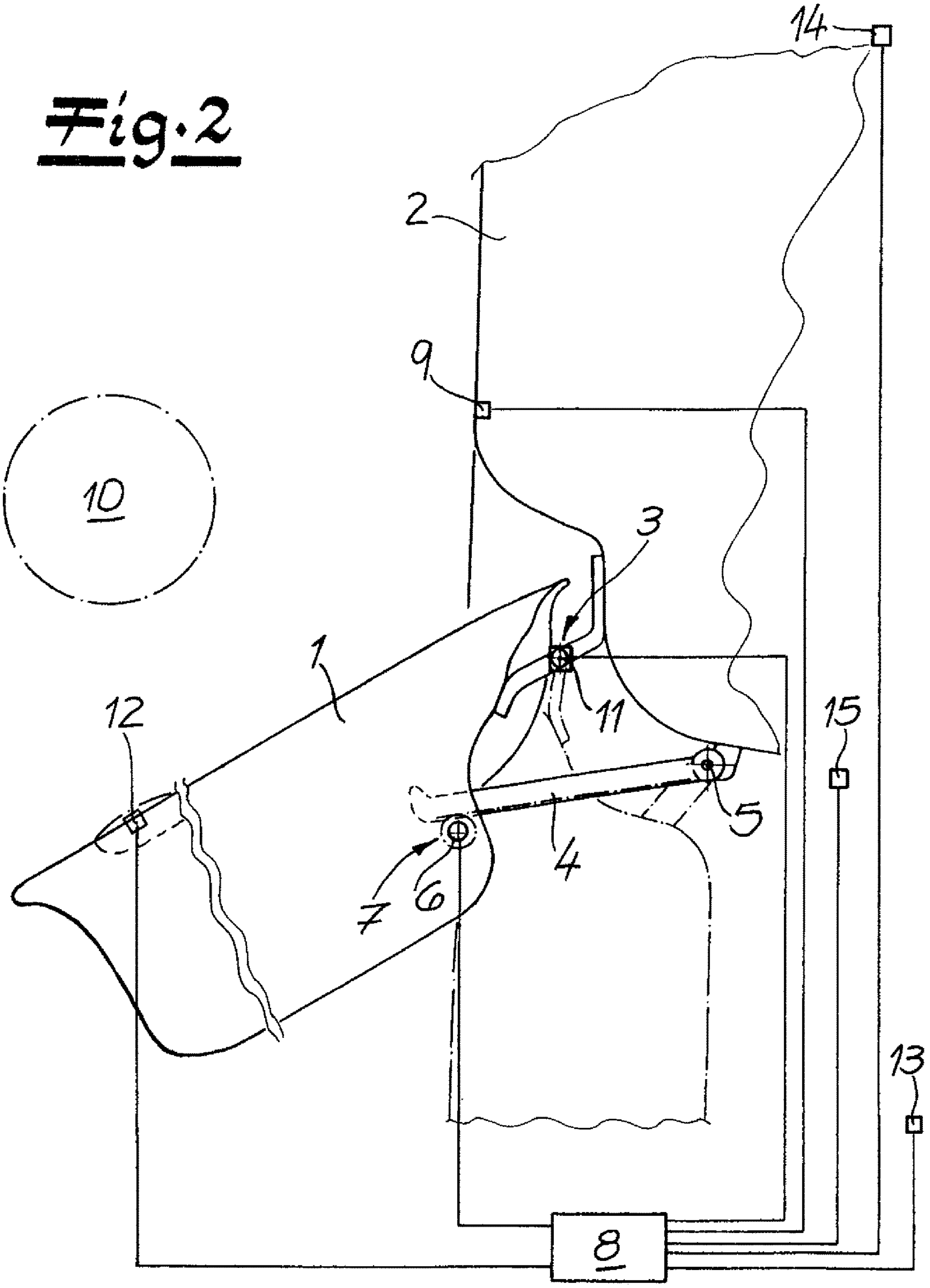
Figure 3:
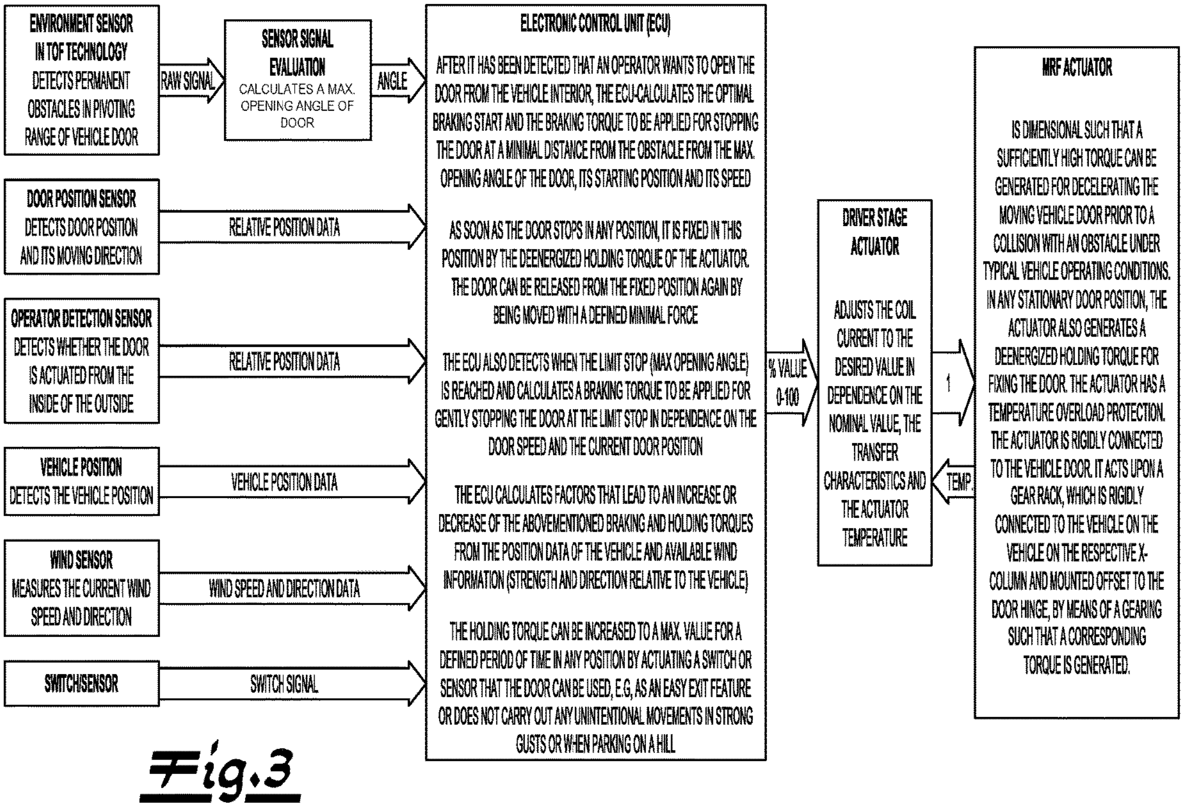

In the detailed view according to FIG. 2, a toothed rack or generally an actuator 4 is also to be seen. The actuator 4 is connected to the motor vehicle chassis 2. Within the scope of the exemplary embodiment, the actuator respectively the toothed rack 4 is linked in a joint 5 to the motor vehicle chassis 2. An actuator 6 combs with the toothed rack 4 or its teeth as a component of a locking device 7. The actuator 6 is controlled with the aid of a control unit 8, if applicable with interposition of a driver stage which is not illustrated and mentioned in FIG. 3.

The configuration is such that the actuator 6 is configured as an electromotor or comprises an electromotor, if applicable in conjunction with a gearbox. As soon as the actuator 6 or the electromotor is energized with the aid of the control unit 8, it generates a relevant braking torque which ensures by means of the engagement of the actuator 6 on the toothed rack 4 that this braking torque decelerates or even completely prevents pivoting movements of the motor vehicle door 1 compared to the motor vehicle chassis 2. For this purpose, the actuator 6 or the locking device 7 in the exemplary embodiment is arranged inside the motor vehicle door 1 or firmly connected to the motor vehicle door 1.

In FIG. 2, a sensor 9 is also to be seen which is assigned to the motor vehicle door 1 and is configured as an environment sensor 9 in the exemplary embodiment. With the aid of the environment sensor 9, the entire possible pivot area of the motor vehicle door 1 depicted by respectively dot-dashed limit lines in FIG. 1 can be investigated and sensed as to whether any obstacles 10 are present or appear in the relevant pivot area.

In addition to the environment sensor 9, the signals of which are processed by the control unit 8, a position sensor 11 is then executed. The position sensor 11 is assigned to the hinge 3 or may even be integrated into the hinge 3. This is because the position sensor 11 is a pivot angle sensor in the exemplary embodiment. With the aid of the position sensor 11 or the pivot angle sensor the pivot angle $\alpha$ completed by the motor vehicle door 1 compared to the motor vehicle chassis 2 and shown as an example in FIG. 1 can be recorded. Furthermore, the control unit 8 can attribute changes of the pivot angle $\alpha$ over time or temporally changing signals of the position sensor 11 to the speed of the motor vehicle door 1 during sweeping of the relevant pivot angle $\alpha$.

In addition to the environment sensor 9 and the position sensor 11 further sensors 12, 13, 14, 15 are realised in FIG. 2, the signals of which are received by the control unit 8 and are used and evaluated for control of the locking device 7 or the actuator 6 in the sense of deceleration of the motor vehicle door 1. The sensor 12 is configured as an operator sensor 12 and is formed as a door handle switch in the present case. With the aid of the operator sensor 12, for example, an opening desire of the operator can be recorded such that this opening desire in the exemplary embodiment corresponds to the operator operating a door handle assigned to the operator sensor 12 and only implied. The door handle can be an internal door handle or an external door handle for the motor vehicle door 1.

A further sensor 13 is also realized which is formed as a motor vehicle position sensor 13 in the present case. In the simplest case, with the aid of the motor vehicle position sensor 13 any gradient of the motor vehicle and consequently of the motor vehicle chassis 2 can be ascertained and corresponding signals can be taken into account by the control unit 8 and evaluated, as described in the introduction. Furthermore, a wind sensor 14 is provided, the signal of which is also used by the control unit 8 to control the locking device 7. Reference is made to the start of the description in this regard. In the present case, the wind sensor 14 may be arranged in the front area of the motor vehicle chassis 2. In contrast, the motor vehicle position sensor 13 is regularly located in the area of the center of a vehicle. The alighting aid sensor 15 which is finally still to be seen is generally arranged on a door or also in the area of a dashboard, a central console, etc. The alighting aid sensor 15 is a switch or a contact sensor in the simplest case. With the aid of the alighting aid sensor 15 an operator can generate a relevant signal which is interpreted by the control unit 8 to the extent that the locking device 7 is actuated to generate a maximum braking torque. The motor vehicle door 1 is thus fixed and can be used as desired by the operator as an alighting aid or also an entry aid, for example.

Finally, the locking device 7 is configured in such a way that the motor vehicle door 1 is impinged on with a holding torque in the immobile state. This holding torque lies adjacent and is regularly generated mechanically on the outlet side of the locking device 7, regardless of whether the control unit 8 actuates the actuator 6. Therefore as soon as the motor vehicle door 1 stands still, it is acted on by the locking device 7 with the relevant holding torque. The holding torque can be generated by the non-energized actuator 6 or also otherwise. The configuration is further such that during movement of the motor vehicle door 1 starting from the immobile state the locking device 7 is detached again.

On the basis of FIG. 1, the method according to the invention is now described to act on the motor vehicle door 1 in the sense of deceleration to prevent a collision. In fact, it is initially proceeded in such a way that during an opening process of the motor vehicle door 1 the operator generates a relevant signal on the input side of the control unit 8 with the aid of the operator sensor 12. Thereupon the control unit 8 queries the environment sensor 9 and also the door sensor 11. If the environment sensor 9 in the example according to FIG. 1 registers the obstacle 10 in the pivot area of the motor vehicle door 1 already referred to, the control unit 8 ensures that the actuator 6 or the locking device 7 impinges on the motor vehicle door 1 taking into account a braking start predetermined by the control unit 8 and with a variable braking torque.

The variable braking torque generated by the locking device 7 is dependent on signals of further sensors 13, 14, 15. For example, if the wind sensor 14 reports wind or gusts of wind, the braking torque is typically increased in order to confront a wind pressure attacking the motor vehicle door 1. A similar case applies where the position sensor 13 ascertains a gradient of the motor vehicle chassis 2 as described at the start.

When the locking device 7 is actuated with the aid of the control unit 8 the control unit 8 takes into account the signals from the relevant sensors 9, 11, 12, 13, 14, 15 such that the braking start and also the braking torque to be exerted is optimally adjusted to the respective situation and ensures that the motor vehicle door 1 stops at a minimum distance and safely before the obstacle 10.

The invention claimed is:

1. A method for impinging on a motor vehicle door during a deceleration to avoid collisions, wherein the motor vehicle includes at least one sensor, a locking device and a control unit, the method comprising:

generating sensor signals via the at least one sensor, actuating the locking device using the control unit for locking the motor vehicle door based on the sensor signals received by the control unit, determining a start of a braking operation of the locking device using the control unit, impinging the locking device on the motor vehicle door based on the start of the braking operation predetermined by the control unit, and varying a braking torque of the locking device that acts on the motor vehicle door, which is variable, based on the sensor signals, wherein generating the sensor signals comprises using an alighting aid sensor to generate a corresponding one of the sensor signals that is received by the control unit which is configured to increase the braking torque of the locking device in response to the corresponding one of the sensor signals.

2. The method according to claim 1 further comprising generating sensor signals from at least two different sensors.

3. The method according to claim 2 further comprising generating sensor signals from an environment sensor and a door sensor.

4. The method according to claim 3 further comprising setting the start of the braking operation and an amount of the braking torque for the locking device based on the sensor signals of the environment sensor and the door sensor.

5. The method according to claim 1 further comprising determining a pivot area of the motor vehicle door and any obstacles therein via an environment sensor.

6. The method according to claim 1 further comprising using a door sensor for at least one of:

detecting a relative position of the motor vehicle door compared to a motor vehicle chassis, and detecting a speed of the motor vehicle door.

7. The method according to claim 6 further comprising determining a pivot angle of the motor vehicle door relative to the motor vehicle chassis via a pivot angle sensor.

8. The method according to claim 1 further comprising:

generating additional sensor signals via at least one of an operator sensor, a motor vehicle position sensor, and a wind sensor, and actuating the locking device based on the additional sensor signals.

9. The method according to claim 8 further comprising:

arranging the operator sensor as a handle switch on an internal door handle or an external door handle; and detecting whether the motor vehicle door is operated by an operator from inside or outside the motor vehicle door via the handle switch.

10. The method according to claim 8 further comprising increasing the braking torque after at least one of:

detecting wind via the wind sensor; and detecting a gradient of a motor vehicle chassis via the motor vehicle position sensor.

11. The method according to claim 1 further comprising actuating the locking device to act on the motor vehicle door in an immobile state with a holding torque independent from actuation by the control unit.

12. The method according to claim 11 further comprising applying the holding torque which is smaller than a maximum braking torque of the locking device.

* * * * *